Figure 1:
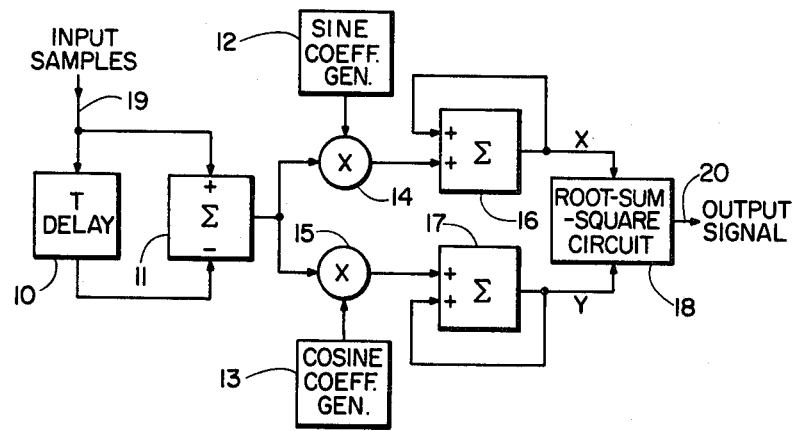

United States Patent [19]

Agnew et al.

[11] 4,363,100
[45] Dec. 7, 1982

[54] DETECTION OF TONES IN SAMPLED SIGNALS

[75] Inventors: David G. Agnew, Ottawa; Sorin Cohn-Sfetcu, Kanata, both of Canada

[73] Assignee: Northern Telecom Limited, Montreal, Canada

[21] Appl. No.: 201,503

[22] Filed: Oct. 28, 1980

[51] Int. Cl.³ .................... G06F 15/31; H04M 1/50
[52] U.S. Cl. ..................... 364/484; 179/84 VF; 364/728
[58] Field of Search ............. 364/484, 486, 701, 724, 364/728; 370/110.3; 179/84 VF; 324/77 H, 78 Q; 328/138, 140

[56] References Cited

U.S. PATENT DOCUMENTS

| | | | |
|---|---|---|---|
| 4,001,521 | 1/1977 | Fukata et al. | 179/84 VF |
| 4,038,540 | 7/1977 | Roberts | 364/728 |
| 4,100,378 | 7/1978 | Claasen et al. | 364/484 |
| 4,109,109 | 8/1978 | Molleron | 179/15 BY |
| 4,164,036 | 8/1979 | Wax | 179/84 VF |

OTHER PUBLICATIONS

A Digital Signal Processor for PCM/TDM Tone Decoding, by M. S. Buser, Proc. Eurocon 77, Venice, Italy, May 1977, pp. 2.5.5.1 to 2.5.5.6.
Simple Multifrequency-Tone Detector, by A. D. Proudfoot, Electronics Letters, vol. 8, No. 21, Oct. 19, 1972, pp. 525 and 526.
A Digital Receiver for Tone Detection Applications, by T. A. C. M. Claasen and J. B. H. Peek, IEEE Transactions on Communications, vol. COM-24, No. 12, Dec. 1976, pp. 1291 to 1300.
J. P. Mills, "Digital MF Receiver Technique," *GTE Automatic Electric Journal,* May 1977, pp. 317-325.

*Primary Examiner*—Jerry Smith
*Attorney, Agent, or Firm*—R. John Haley

[57] ABSTRACT

A tone detector in the form of a digital correlator is disclosed in which PCM signal samples are delayed in a RAM for the correlation period. Using PROMs, the products of the current and delayed samples with samples of a sine signal at the frequency to be detected are produced, and their difference is cumulatively summed to produce a first accumulated signal. A second accumulated signal is similarly produced using samples of a cosine signal at the frequency to be detected, and an output signal indicating the presence or absence of the tone is produced from the sum of the squares of the two accumulated signals. The use of memories enables the detector to be readily multiplexed for detection of a plurality of tones on each of a plurality of channels.

9 Claims, 2 Drawing Figures

DETECTION OF TONES IN SAMPLED SIGNALS

This invention relates to the detection of predetermined frequency components, or tones, in sampled signals.

It is commonly required in communication systems to detect the presence of tones in received signals. For example, tone detection is necessary in telephone communication systems using tone dialling and multifrequency code (MFC) signalling. Frequently the signals in which tones must be detected are sampled signals; for example they may be PCM signals.

It is known to detect the presence of tones in sampled signals using digital filters, one filter being provided for each tone frequency which is to be detected. For example in "A Digital Signal Processor for PCM/TDM Tone Decoding" by M. S. Buser, Proc. Euroncon 77, Venice Italy, May 1977, pages 2.5.5.1 to 2.5.5.6 there is described a digital filter and discrete Fourier transform for MFC decoding, by means of which 20 tone frequencies can be detected. In such a digital filter PCM signal samples are delayed in a buffer line, and for each new sample the variously delayed samples are read out from the buffer (for example there may be 256 samples read out) and are supplied to arithmetic units which serve to multiply the samples by sets of coefficients which are stored in PROMs, the products then being summed and two resultant sums being stored in a working memory. The arithmetic units also determine the square root of the sum of the squares of these resultant sums. These steps are performed for each frequency to be detected, for each PCM channel, and for each sample. As a result, a relatively complicated, large, and expensive arrangement is required in order to effect the desired detection of tone frequencies.

In order to provide a simpler method of tone detection than is provided by digital filters, there has been proposed (A. D. Proudfoot, "Simple Multifrequency-Tone Detector," Electronics Letters, Vol. 8 No. 21, Oct. 19, 1972, pages 525 and 526) a digital correlator in which incoming PCM signal samples are gated with two stored sequences of sign bits, representing the sign of out-of-phase signals at the frequency to be detected, and the resultant signals are accumulated in two accumulators over a set correlation period. At the end of this period the larger magnitude one of the accumulated signals is selected as an indication of the presence or absence of the relevant frequency, and the accumulators are reset. However, this arrangement suffers from a disadvantage in that harmonics resulting from using the single bit sequences, which correspond to square waves rather than preferred purely sinusoidal signals, can cause problems because of aliasing. In addition, because of the accumulation over the correlation period and subsequent resetting of the accumulators, in order to detect tones which may occur at arbitrary times the correlation period must be relatively short, for example 12 ms for detecting tones of at least 40 ms duration. The selectivity of the detector, which increases as the correlation period is increased, is therefore relatively low.

In order to overcome the problem of aliasing, whilst still using single bit correlation sequences, there is described in "A Digital Receiver for Tone Detection Applications" by T. A. C. M. Claasen and J. B. H. Peek, IEEE Transactions on Communications, Vol. COM-24, No. 12, December 1976, pages 1291 to 1300, a digital correlator in which signals to be correlated are transformed into one-digit binary signals that have approximately the same correlation function. The transformation is effected by adding auxiliary signals to the signals to be correlated and taking the sign of the sum signal. In order to enable detection of tones occurring at arbitrary times, this article further describes that an accumulator provided in the detector may be provided with some leakage according to a predetermined factor, or may have its contents cyclically reduced by a constant amount and be reset to zero if the result is negative. Each of these proposals involves the disadvantage and difficulty of selecting an appropriate factor or constant amount.

Accordingly, an object of this invention is to provide an improved method of and apparatus for detecting the presence of a predetermined frequency component in a sampled signal.

According to this invention there is provided a method of detecting the presence of a predetermined frequency component in a signal sampled with a sampling period t, comprising: producing samples of said signal delayed by a predetermined correlation period T; producing samples with a sampling period t of first and second signal sequences representing respective signals at said predetermined frequency having a phase difference other than 0 or $\pi$; cumulatively producing for each signal sample first and second accumulated signals, each of the first and second accumulated signals being equal to the first or second, respectively, accumulated signal produced for the previous signal sample modified in dependence upon the product of the current sample of the first or second, respectively, signal sequence with the difference between the current signal sample and the current delayed signal sample; and deriving from the first and second accumulated signals an output signal which represents the presence or absence of the predetermined frequency component during the preceding correlation period T. Preferably the first and second signal sequences represent signals in phase quadrature, i.e. sine and cosine signals, at said predetermined frequency.

The cumulative production of the accumulated signals avoids the need for periodic resetting of accumulators as in the prior art, and provides for the production of the output signal at the same rate as the sampled input signal so that tones occurring at arbitrary times can be readily detected.

Figure 2:
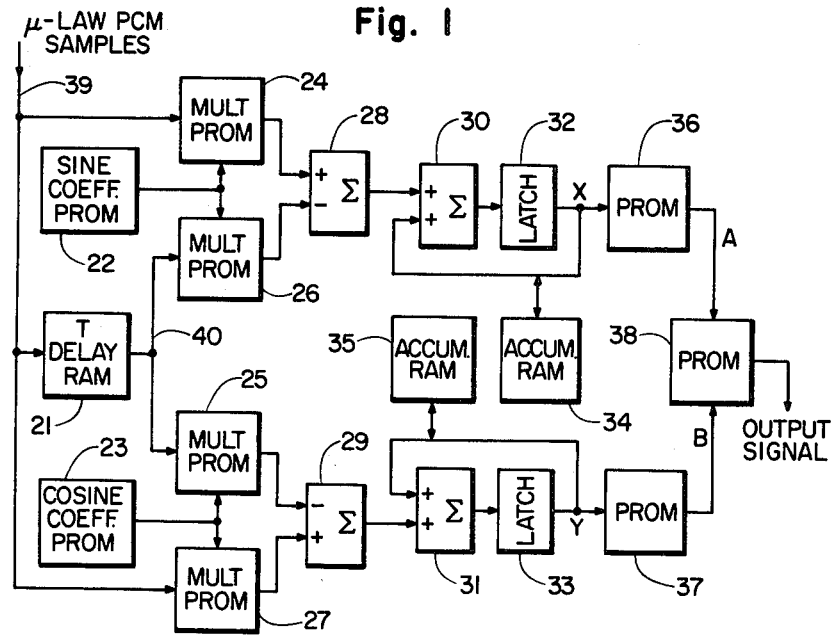

The invention will be further understood from the following description with reference to the accompanying drawings, in which:

FIG. 1 illustrates a tone detector with reference to which the principles of the invention are explained; and FIG. 2 illustrates in greater detail a preferred form of tone detector in accordance with the invention.

Referring to FIG. 1, there is shown therein a tone detector in the form of a correlator comprising a delay unit 10, a subtracter 11, sine and cosine coefficient generators 12 and 13, multipliers 14 and 15, accumulators 16 and 17, and a root-sum-square circuit 18. The detector serves to detect the presence of a predetermined tone, or frequency component, in a signal, sampled with a sampling period t, whose samples are present on an input line 19, and to provide an output signal representing the presence or absence of the tone on an output line 20.

The delay unit 10, which can comprise a RAM (random access memory), serves to delay each signal sample on the line 19 by a period T which is referred to as the correlation period. The period T is selected to be a multiple of the sampling period t, for example T=128 t so that the correlation period extends over 128 signal samples. Preferably, for selectivity, the period T is also such that $\omega T = n\pi$, where $\omega$ is the angular frequency of the tone to be detected and n is a positive integer, so that the correlation period extends over a whole number of half-cycles of a signal at the frequency to be detected. In order to avoid a possibility of overflow of the accumulators 16 and 17 in the event that the sampled input signal comprises a continuous sinusoid, preferably the period T is such that $\omega T = 2n\pi$, $\omega$ and n having the same meanings as above.

The subtractor 11 is supplied with the input signal samples on the line 19 and the delayed samples from the output of the delay unit 10, and produces the difference between these. This difference is multiplied in the multipliers 14 and 15 by respective coefficients supplied by the generators 12 and 13. Each of these generators 12 and 13 can comprise a ROM (read-only memory) in which the coefficients are stored as digital signals. The coefficients produced by each generator are samples of a sinusoidal signal at the frequency to be detected, the samples having the sampling period t and extending over the correlation period T. (Alternatively, the correlation period T can be an integral multiple of the period over which the coefficient samples extend.) Thus in the case where T=128 t, each generator cyclically produces 128 coefficients during each period T. The signals represented by the coefficients produced by the generators 12 and 13 differ in phase by other than 0 or $\pi$; preferably the signals are in phase quadrature and hence the coefficients are referred to as sine and cosine coefficients.

The accumulators 16 and 17 cumulatively add the products from the multipliers 14 and 15 to produce signals X and Y, and the root-sum-square circuit 18 produces from these the output signal proportional to $\sqrt{X^2 + Y^2}$. It can be shown that this signal is a representation of the presence or absence of the tone frequency in the sampled signal on the line 19.

It can be seen that at any time the signal X is equal to the sum of the products of the samples on the line 19 with the coefficients from the generator 12 over the preceding correlation period T. By virtue of the provision of the delay unit 10 and the subtractor 11, this signal X is updated accurately in respect of each sample on the input line 19, without requiring the accumulator 16 to be reset. Similar comments apply in respect of the signal Y. Consequently, the output signal is a reliable and accurate indication of the presence or absence of the relevant frequency, and can be used to detect tones which occur at arbitrary times.

In practice, the signal samples on the line 19 will normally be non-linearly (e.g. mu-law) encoded PCM signals. In order to accommodate the non-linear encoding, a non-linear to linear decoder (not shown) can be included in the input line 19, or the subtractor 11 may incorporate means for producing the correct (not encoded) difference signal from the non-linearly encoded signals with which it is supplied. Alternatively, the components may be rearranged, as described below with reference to FIG. 2, to accommodate appropriate decoding.

Having described the principles of the present invention with reference to FIG. 1, reference is now made to FIG. 2 which illustrates a preferred form of tone detector. The tone detector of FIG. 2 comprises a delay RAM 21, sine and cosine coefficient PROMs (programmable ROMs) 22 and 23, multiplier PROMs 24 to 27, subtractors 28 and 29, adders 30 and 31, latches 32 and 33, accumulator RAMs 34 and 35, and further PROMs 36 to 38.

Eight-bit (sign bit and seven magnitude bits) mu-law encoded PCM input signal samples at a sampling frequency of 8 kHz (sampling period t=0.125 ms) are supplied via an input line 39 to the delay RAM 21, which is cyclically addressed so that each sample is stored therein for a correlation period of T=16 ms (128 PCM frames) before being read out to a line 40. The PROMs 22 and 23 store sine and cosine coefficients, or samples, of phase-quadrature signals at the tone frequency to be detected over the period T=16 ms, as already described with reference to FIG. 1, and are likewise cyclically addressed to read out these coefficients. Each coefficient is in the form of a four-bit (sign bit and three magnitude bits) digital signal.

The lines 39 and 40, and the outputs of the PROMs 22 and 23, are connected to address inputs of the multiplier PROMs 24 to 27 as shown, each of which is programmed to produce at its output the product, converted into a linear code from mu-law encoding of the PCM signal samples, of the PCM sample and the coefficient supplied to its inputs. Thus the current and delayed PCM signal samples are multiplied by the current sine and cosine coefficients to produce four products. Each product is in the form of an eight-bit (sign bit and seven magnitude bits) digital signal.

In the subtractor 28 the product of the sine coefficient with the delayed PCM sample produced by the multiplier PROM 26 is subtracted from the product of the sine coefficient with the current PCM sample produced by the multiplier PROM 24, to produce a nine-bit (sign bit and eight magnitude bits) digital signal which is equivalent to the signal produced at the output of the multiplier 14 in FIG. 1. As in FIG. 1, this signal is cumulatively added to produce the signal X. In the detector of FIG. 2, the cumulative addition is effected by the adder 30 adding the current signal supplied by the subtracter 28 to a sixteen bit (sign bit and fifteen magnitude bits) previous sum which is read out from the accumulator RAM 34, the new sum being latched in the latch 32 to constitute the signal X and then being stored in the accumulator RAM 34 in place of the previous sum. The signal Y is produced in an identical manner from the outputs of the multiplier PROMs 25 and 27, using the components 29, 31, 33, and 35.

The PROMs 36 to 38 correspond to the circuit 18 of FIG. 1. Three individual PROMs are used in order to reduce the total memory capacity required to handle the two signals X and Y, only the eight most significant magnitude bits of each of which are used in producing the output signal. The PROM 36 is programmed to produce, from the eight magnitude bits of the signal X with which it is addressed, a five-bit digital signal A which is proportional to log $X^2$. The PROM 37 is similarly programmed to produce a five-bit digital signal B proportional to log $Y^2$. The PROM 38 is programmed to produce, from the two five-bit signals A and B, the output signal proportional to log $(e^A + e^B)$, which signal is in fact dependent upon the sum $X^2 + Y^2$.

Although the tone detector shown in FIG. 2 has been described in relation to the detection of a single tone frequency for a single channel, it is in fact ideally suited to multiplexing for the detection of a plurality of tone frequencies for a plurality of channels. Thus for each of a plurality of tone frequencies, the PROMs 22 and 23 can store a respective set of coefficients corresponding to the respective frequencies, and the accumulator RAMs 34 and 35 can store respective cumulative sums all over the same correlation period T. The output signal, multiplexed in time for the different frequencies, can be subsequently demultiplexed for detection of particular tone frequency combinations which may be used for example in MFC signalling. The arrangement may be further multiplexed for a plurality of PCM channels whose signal samples are time division multiplexed on the input line 39. In this case, the delay RAM 21 and the accumulator RAMs 34 and 35 can provide storage locations for the samples and cumulative sums, respectively, of each of the channels. Again the output signal is multiplexed for the various channels. A multiplexed tone detector as described above with reference to FIG. 2 can for example be conveniently used in MFC signalling for detection of 16 tones, or frequency components, on each of 24 PCM channels.

As already described, it is preferred that $\omega T = n\pi$, or more preferably $\omega T = 2n\pi$, where $\omega$ is the angular frequency to be detected and n is an integer. For MFC signalling in which the tone detector is used in the multiplexed manner described above for detection of a plurality of tone frequencies, it is preferable to select the different tone frequencies so that this relationship is satisfied for each of them. However, it is not essential to the operation of the tone detector that this relationship be satisfied, especially when the correlation period T is very large in relation to the period of the frequency to be detected.

As already described, the cumulative accumulation provided in the tone detectors of the present invention avoids the need found in the prior art to reset an accumulator periodically. However, in the present tone detectors it is obviously necessary on initially commencing operation to clear the accumulator. In addition, there is a risk that the accumulated values X and Y may be affected by errors in the operation of the various memories; this is particularly so if dynamic memories are used. Accordingly, it is desirable to reset the accumulated values X and Y to zero occasionally to ensure that any errors which may be present do not accumulate. This is most conveniently achieved by arranging for the values X and Y to be reset to zero a predetermined period after the end of the detection of a tone frequency.

As described above, each of the coefficients produced by the PROMs 22 and 23 has four bits, but a different number of bits may be used. Preferably, however, each coefficient has from two to four bits. Providing only one-bit coefficients can cause problems because of aliasing, as already described with reference to the prior art, and there is no significant benefit in the overall tone detector performance from using more than four bits.

Numerous other modifications, variations, and adaptations to the described embodiments of the invention may be made without departing from the scope of the invention as defined in the claims.

What is claimed is:

1. A method of detecting the presence of a predetermined frequency component in a signal sampled with a sampling period t, each signal sample comprising a plurality of bits, the method comprising:

delaying the samples of said signal by a predetermined correlation period T to produce delayed signal samples;

producing samples with a sampling period t of first and second signal sequences representing respective signals at said predetermined frequency having a phase difference other than 0 or $\pi$, each sample of the first and second signal sequences comprising a plurality of bits;

cumulatively producing for each signal sample first and second accumulated signals, each of the first and second accumulated signals being equal to the first or second, respectively, accumulated signal produced for the previous signal sample modified in dependence upon the product of the current sample of the first or second, respectively, signal sequence with the difference between the current signal sample and the current delayed signal sample; and deriving from the first and second accumulated signals an output signal which represents the presence or absence of the predetermined frequency component during the preceding correlation period T.

2. A method as claimed in claim 1 wherein said first and second signal sequences represent signals in phase quadrature at said predetermined frequency.

3. A method as claimed in claim 1 wherein said output signal is derived by:

producing a signal $A \propto \log X^2$, where X is the first accumulated signal;

producing a signal $B \propto \log Y^2$, where Y is the second accumulated signal; and producing the output signal proportional to $\log (e^A + e^B)$.

4. A method as claimed in claim 3 wherein the first and second accumulated signals are digital signals each having a first number of bits, and the signals A and B are digital signals each having a second number, less than the first number, of bits.

5. A method as claimed in claim 1 or 3 wherein $\omega T = n\pi$, where $\omega$ is the angular frequency of said predetermined frequency component and n is a positive integer.

6. A method as claimed in claim 1 or 3 wherein $\omega T = 2n\pi$, where $\omega$ is the angular frequency of said predetermined frequency component and n is a positive integer.

7. A method as claimed in claim 1 wherein the first and second accumulated signals are cumulatively produced by:

multiplying each of the current and delayed signal samples by each of the current samples of the first and second signal sequences, each multiplication being effected using values stored in a memory; and adding to the first and second accumulated signals produced for the previous signal sample the product of the current sample of the first or second, respectively, signal sequence with the current signal sample and subtracting therefrom the product of the current sample of the first or second, respectively, signal sequence with the delayed signal sample to produce the first and second, respectively, accumulated signals for the current signal sample.

8. A method as claimed in claim 7 wherein the signal samples are non-linearly encoded signal samples, wherein the step of multiplying the current and delayed samples by the samples of the signal sequences includes the step of decoding from the non-linear code whereby the resultant products are linear.

9. A method as claimed in claim 1 wherein the first and second accumulated signals are cumulatively produced by:
  subtracting the delayed signal sample from the current signal sample to produce a difference signal sample;
  multiplying the difference signal sample by each of the current samples of the first and second signal sequences to produce first and second products respectively, each multiplication being effected using values stored in a memory; and
  adding the first and second products to the first and second, respectively, accumulated signals produced for the previous signal sample to produce the first and second, respectively, accumulated signals for the current signal sample.

* * * * *